US012789993B2

(12) United States Patent
Ifill

(10) Patent No.: US 12,789,993 B2
(45) Date of Patent: Nov. 10, 2026

(54) DISTANCE SENSED VERTICAL DESCENT ARREST SYSTEM AND METHODS

(71) Applicant: AeroVironment, Inc., Arlington, VA (US)

(72) Inventor: Joel Ifill, Chatsworth, CA (US)

(73) Assignee: AeroVironment, Inc., Arlington, VA (US)

( * ) Notice: Subject to any disclaimer, the term of this patent is extended or adjusted under 35 U.S.C. 154(b) by 261 days.

(21) Appl. No.: 18/444,403

(22) Filed: Feb. 16, 2024

(65) Prior Publication Data

US 2024/0278915 A1 Aug. 22, 2024

Related U.S. Application Data

(60) Provisional application No. 63/446,504, filed on Feb. 17, 2023.

(51) Int. Cl.
*B64D 1/14* (2006.01)
*B64U 20/30* (2023.01)
*B64U 101/69* (2023.01)

(52) U.S. Cl.
CPC ............... *B64D 1/14* (2013.01); *B64U 20/30* (2023.01); *B64U 2101/69* (2023.01)

(58) Field of Classification Search
CPC ... B64D 1/14; B64D 1/08; B64D 1/12; B64D 17/00; B64U 20/30; B64U 2101/69; B64U 10/13
See application file for complete search history.

(56) References Cited

U.S. PATENT DOCUMENTS

| | | | | |
|---|---|---|---|---|
| 9,663,234 | B1 * | 5/2017 | Hanlon | B65D 5/4233 |
| 9,896,182 | B1 * | 2/2018 | Beckman | G05D 1/106 |
| 10,112,721 | B2 * | 10/2018 | Sweeny | B64D 17/80 |
| 10,384,780 | B1 * | 8/2019 | Doman | B64D 1/12 |
| 11,762,398 | B1 * | 9/2023 | Taylor | G05D 1/0676 701/16 |
| 2009/0026319 | A1 * | 1/2009 | Strong | B64D 1/08 244/152 |
| 2019/0337637 | A1 * | 11/2019 | Lin | G01C 5/005 |
| 2020/0033854 | A1 * | 1/2020 | Jeong | B64D 17/34 |
| 2020/0286028 | A1 * | 9/2020 | Ifill | G06Q 10/083 |
| 2020/0310467 | A1 * | 10/2020 | Birkedahl | G05D 1/0676 |
| 2021/0276735 | A1 * | 9/2021 | Raptopoulos | A47G 29/141 |
| 2022/0267004 | A1 * | 8/2022 | Truslow | B64D 43/00 |

* cited by examiner

*Primary Examiner* — Anne Marie Antonucci
*Assistant Examiner* — Connor L Knight
(74) *Attorney, Agent, or Firm* — Command IP LLP; Pejman Yedidsion; Eric Aagaard

(57) ABSTRACT

An aerial payload vehicle descent arrest system is disclosed in which a flight controller may receive outputs from multiple sensors including at least one global navigation satellite system receiver and multiple relative range sensors. Sensor data are fused using a state prediction algorithm to estimate an above-ground-level height relative to a target destination. Based on the estimated height and descent conditions, the system may generate a descent arrest device trigger signal to deploy a parachute, rotor, airbag, or other arrest mechanism before payload delivery. The trigger height may be dynamically recalculated in response to detected faults or changing descent characteristics, and may incorporate data from ground-based sensors proximate the target destination.

20 Claims, 6 Drawing Sheets

100

300

500

600

DISTANCE SENSED VERTICAL DESCENT ARREST SYSTEM AND METHODS

CROSS-REFERENCE TO RELATED APPLICATIONS

This application claims the benefit of U.S. Provisional Patent Application Ser. No. 63/446,504 filed Feb. 17, 2023. The disclosure of the application listed above is incorporated herein by reference in its entirety.

An aerial payload vehicle descent arrest system includes an aerial payload vehicle configured to descend along a predetermined flightpath toward a target destination and includes a descent state detection system configured to receive sensor output information from a plurality of sensors to compute a sensed distance to the target destination. The descent state detection system generates a descent arrest device trigger signal based on a sensed altitude, and a descent arrest device receives the descent arrest device trigger signal from the descent state detection system to decelerate the aerial payload vehicle before a payload from the aerial payload vehicle is delivered to the target destination.

BACKGROUND

The purpose of aerial payload vehicles and/or aerial cargo delivery systems is to provide cargo, contents, sensors or other internal payload, (also referred to as cargo), from an initial launching point in the air with respect to a parent aircraft or parent aerial vehicle to a target destination location on a surface of the ground, water or another static structure in such a manner that the payload cargo is delivered intact and without damage. To protect payload cargo from damage due to terminal descent speeds, methods of arresting descent of the aerial payload vehicle is employed. Common descent arrest methods include the following.

Parachutes may deploy a shaped fabric attached to the aerial payload vehicle to be filled with air in order to increase a drag coefficient of the aerial payload vehicle and thereby reduce its terminal velocity.

Autorotating systems or rotor systems including one or more rotating blades attached to the aerial payload vehicle, in either an unpowered or a powered configuration, provide downward thrust sufficient to slow or arrest the vertical descent of the aerial payload vehicle.

Deployable airbag or impact absorption device attached to the aerial payload vehicle may include an inflatable device with a contained volume that may be filled with gas, fluids, or a crushable material which may compress upon the impact of landing the aerial payload vehicle configured to decelerate and arrest vertical descent.

A net or harness may be suspended above the target destination to catch the descending aerial payload vehicle prior to and/or in avoidance of ground contact at damaging velocities of the aerial payload vehicle.

Previous payload descent arrest systems are triggered by systems of lanyards, "static lines," singular sensors such as GPS altimetry or barometric altimetry, or dead-set timers, to actuate a release mechanism in deployment of a descent arrest system. These prior methods do not directly sense a distance-to-ground of the payload during deployment and instead rely on predetermined distance approximations or inference.

Furthermore, these prior systems cannot dynamically recompute any optional arrest deployment height due to any parameter change during the payload descent such as a different terminal velocity, altitude density, payload position, or payload pose relative to terrain.

The inability to dynamically sense and adjust deployment of the descent arrest system initiation may create large errors in ground distance estimation and non-optimal descent arrest, (or "flare"), triggering, resulting in triggering the descent arrest system either too high with an early trigger signal, or too low with a late signal. If the descent arrest trigger (flare) signal is trigger too low or late, the payload may crash into the ground without sufficient deceleration.

To account for this, prior system descent arrest deployment triggers are typically set to a conservatively high or early value to account for sensor height and distance inaccuracies, which lowers accuracy and reliability of aerial payload-to-target deliveries.

BRIEF SUMMARY

It should be appreciated that this Summary is provided to introduce a selection of concepts in a simplified form that are further described below in the Detailed Description. This Summary is not intended to be used to limit the scope of the claimed subject matter.

In some aspects, the techniques described herein relate to an aerial payload vehicle descent arrest system including: an aerial payload vehicle configured to descend along a predetermined flightpath toward a target destination; a descent state detection system configured to receive sensor output information from a plurality of sensors, to compute a sensed distance to the target destination based on sensor output information from at least two sensors of the plurality of sensors, and to generate a descent arrest device trigger signal based on a sensed altitude; and a descent arrest device configured to receive the descent arrest device trigger signal from the descent state detection system and to decelerate the aerial payload vehicle before a payload from the aerial payload vehicle is delivered to the target destination.

In some aspects, the techniques described herein relate to a method of activating a descent arrest device associated with an aerial payload vehicle which is configured to descend along a predetermined flightpath toward a target destination, the method including: providing a processor that executes processor instructions stored in a memory, wherein the processor instructions being executed are configured to: determine a flight state of an aerial payload vehicle based on processing an output of a plurality of sensors; determine a height of the aerial payload vehicle above a target destination when the aerial payload vehicle is determined to be in a steady state along the predetermined flightpath; determine a descent arrest device trigger signal height above the target destination; and communicate a descent arrest device trigger signal when the aerial payload vehicle approaches the descent arrest device trigger signal height; and deploy a descent arrest device based on receiving the descent arrest device trigger signal configured to decelerate the aerial payload vehicle before a payload from the aerial payload vehicle is delivered to the target destination.

In some aspects, the techniques described herein relate to an aerial payload vehicle including: a compartment for a payload configured to descend along a predetermined flightpath toward a target destination for attempting delivery of the payload to the target destination; a descent state detection system configured: to receive sensor output information from a plurality of sensors disposed on the aerial payload vehicle; to compute a sensed distance to the target destination based on sensor output information from at least two sensors of the plurality of sensors; and to generate a descent arrest device trigger signal based on a sensed altitude; and a descent arrest device disposed on the aerial payload vehicle and configured: to receive the descent arrest device trigger signal from the descent state detection system; and to decelerate the aerial payload vehicle before the payload is delivered to the target destination.

BRIEF DESCRIPTION OF THE SEVERAL VIEWS OF THE DRAWINGS

The aspects described herein will be better understood from the following detailed description with reference to the drawings, which are not necessarily drawing to scale and in which.

DETAILED DESCRIPTION

In the system and methods disclosed herein, a flight controller is coupled to a plurality of sensors in order to provide higher fidelity measurement of a payload vehicle height above the target destination to precisely trigger or sequence a descent arrest system or device.

Figure 1:
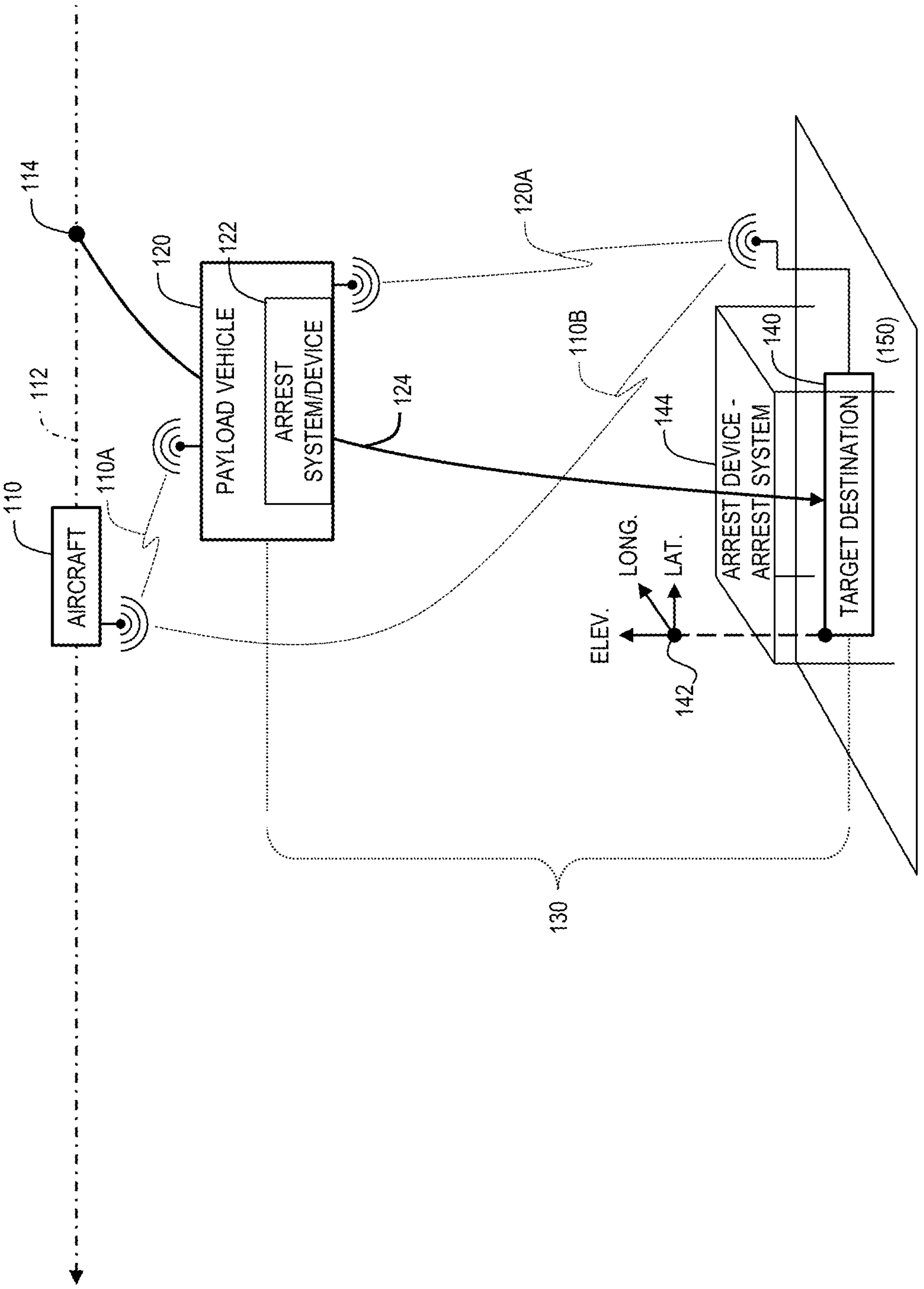
FIG. 1 illustrates a schematic system diagram of a distance sensed aerial payload vehicle descent arrest system for delivering an aerial payload vehicle toward a target destination.

FIG. 1 illustrates a schematic system diagram 100 of a distance sensed aerial payload vehicle descent arrest system that may contain three components: aerial vehicle or aircraft 110 configured to travel along an aircraft flightpath 112; an aerial payload vehicle 120, that may contain a payload vehicle descent arrest system 122, being initially attached to the aircraft 110 and subsequently released at a payload vehicle deployment point 114 on the aircraft flightpath 112 to be delivered along a predetermined payload vehicle flightpath 124 toward a target destination 140; and the target destination 140 having physical target destination coordinates 142, where the target destination 140 that may contain a target destination descent arrest system 144. The aircraft 110 additionally includes an aircraft coordinate reference frame 110B defining elevation, longitudinal, and lateral axes used for navigation and payload deployment calculations.

The payload vehicle descent arrest system 122 may be a parachute or a plurality of parachutes configured to slow the descent of the aerial payload vehicle 120 by wind drag, an autorotating blade assembly configured to slow the descent of the aerial payload vehicle 120 by providing an upward thrust force component on the aerial payload vehicle, or an inflatable or frangible impact absorption device configured to provide an air pocket or crushable device that is design to absorb impact of the aerial payload vehicle 120 when contacting the target destination 140 in the target destination surface 150.

The aerial vehicle or aircraft 110 may include an aircraft flight computer 310 and an Aerial Delivery System 320 (ADS), later described in FIG. 3, where the ADS 320 or the aircraft 110 may provide one-way or two-way communication 110A via a communication device to the payload vehicle 120 having a corresponding communication device. The aircraft 110 may have a portion of the aircraft flightpath 112 controlled by the ADS 320 to ensure the payload vehicle 120 stored onboard the aircraft 110 is released or deployed from the aircraft 110 at the exact moment in time and location of the payload vehicle deployment point 114 on the aircraft flightpath 112 to ensure the payload vehicle 120 maintains its trajectory on the payload vehicle flightpath 124.

The payload vehicle flightpath 124 may be predetermined by the ADS 320 aboard the aircraft 110 before reaching the payload vehicle deployment point 114 and communicated to the payload vehicle 120 at least before the payload vehicle deployment point 114 and may be updated by the ADS 320 via the one-way or two-way communication 110A to the payload vehicle 120. In addition, or in the alternative, the payload vehicle flightpath 124 may be determined and maintained by a payload vehicle flight controller 350, later described in FIG. 3.

While the payload vehicle 120 is maintaining the payload vehicle flightpath 124 as it descends to the target destination 140, the payload vehicle 120 may be in one-way or two-way communication 120A with the target destination 140 and/or the target destination descent arrest system 144. The one-way or two-way communication 120A from the payload vehicle 120 may be with the target destination 140 and/or the target destination descent arrest system 144 and may include information regarding ambient weather conditions, payload vehicle dynamics, location information, pose information of the payload vehicle, a descent arrest system trigger signal, and navigation control information.

Additionally, while the payload vehicle 120 is maintaining the payload vehicle flightpath 124 as it descends to the target destination 140, the payload vehicle 120 is continuously calculating a payload vehicle distance 130 to the target destination for comparison to a payload vehicle descent arrest system trigger distance to deploy the payload vehicle descent arrest system 122 or the target destination descent arrest system 144 in advance of the payload vehicle 120 reaching the target destination 140.

The target destination 140 may be disposed on a target destination surface 150 that may include a ground surface, a water surface, another vehicle surface, for example a naval vessel or a land-based vehicle, or a structure being supported on another surface, for example, a helicopter landing pad attached to a skyscraper.

Figure 2:
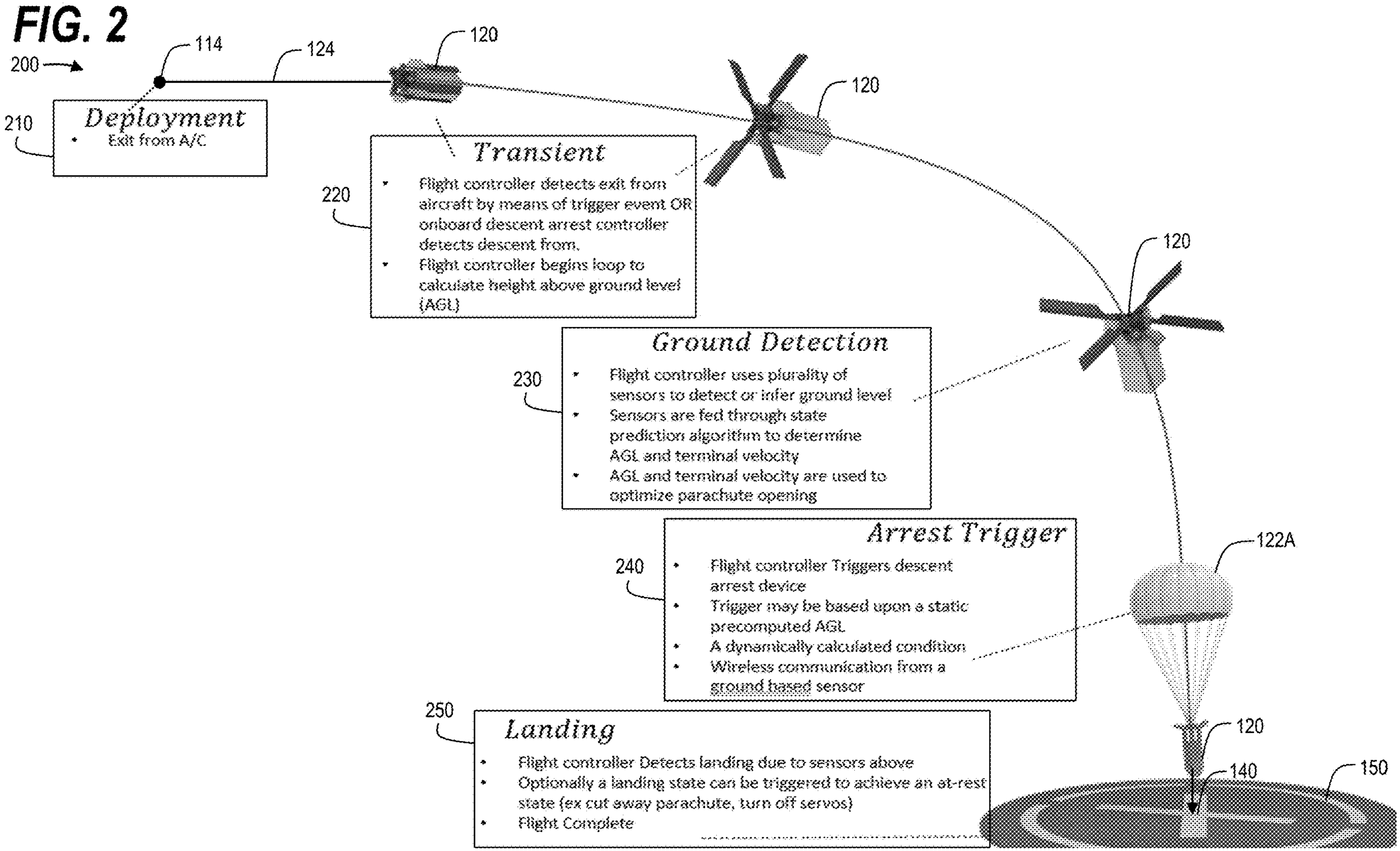
FIG. 2 illustrates a schematic state diagram of a number of flight states of the aerial payload vehicle as it descends toward the target destination.

FIG. 2 illustrates a schematic state diagram 200 of a number of flight states of the aerial payload vehicle 120 as it descends along the payload vehicle flightpath 124 toward the target destination 140 on the target destination surface 150.

An idle/deployment state 210 represent a state where the payload vehicle 120 is aboard the aircraft 110 and then immediately upon deployment at the payload vehicle deployment point 114. The idle/deployment state 210 may be defined where the sensors are in standby waiting for sensing an exit of the payload vehicle 120 from the aircraft 110 and monitoring conditions to detect faults and confirm readiness.

A transient state 220 occurs immediately after the deployment state 210 where the payload vehicle 120 is now outside the aircraft 110 and descending along the payload vehicle flightpath 124. In the transient state 220, the payload vehicle flight controller 350 aboard the payload vehicle 120 detects the exit from the aircraft 110 by a trigger event occurring at the payload vehicle deployment point 114 and/or the payload vehicle flight controller 350 detecting from sensors onboard the payload vehicle 120 that the payload vehicle 120 is descending along the payload vehicle flightpath 124. The payload vehicle flight controller 350 is coupled to one or multiple sensors of the payload vehicle sensor suite 354 in order to provide higher fidelity measurement of height above the target destination 140 to precisely trigger or sequence a descent arrest. During the transient state 220, the payload vehicle flight controller 350 initiates an above target destination height determination algorithm that determines the Above Ground Level (AGL) measurement with respect the payload vehicle 120 above the target destination 140.

The transient state 220 may be defined where the sensors of the payload vehicle sensor suite 354 detect the payload vehicle 120 being released from the aircraft 110 or a deployment trigger indicates release condition of the payload vehicle 120 from the aircraft 110, (e.g., a Bluetooth packet), and notifies the payload vehicle flight controller 350 that release has occurred. Detection of the transient state 220 may also optionally turn on or initialize sensor in the payload vehicle sensor suite 354, e.g., by setting a barometric reading at a reference altitude, or starting a dead-set timer.

A steady state or ground detection state 230 occurs when the payload vehicle flight controller 350 has completed stabilizing the pose of the payload vehicle 120 with respect to the payload vehicle flightpath 124. The payload vehicle flight controller 350 utilizes a plurality of onboard sensors to detect or infer the AGL and terminal velocity of the payload vehicle 120 by fusing the plurality of sensor's input into a state determination algorithm of the payload vehicle flight controller 350.

Steady state or ground detection state 230 may be defined as where the payload vehicle sensor suite 354 are continuously detecting and updating a calculated distance above the target destination 140. Optionally, the payload vehicle sensor suite 354 may collect additional sensor information such as rotational pose, heading or terminal velocity of the payload vehicle 120.

A descent arrest deployment trigger state 240 the determined AGL and terminal velocity of the payload vehicle 120 is used by the payload vehicle flight controller 350 to determine a trigger signal for the payload vehicle descent arrest system 122, to deploy a payload vehicle descent arrest device 122A, for example, a parachute, or the target destination descent arrest system 144 to deploy a descent arrest device at either location. In the alternative, the trigger signal may determine based on a static precomputed AGL.

The descent arrest deployment trigger state 240 may be based upon fused sensor information provided by the payload vehicle sensor suite 354 to the payload vehicle state detection system 352, where a flare algorithm determines the appropriate location and/or timing to actuate the descent arrest system via a trigger signal via payload vehicle flight controller descent arrest system trigger signal link 350A. Additionally, or alternatively, the sensor information from the payload vehicle sensor suite 354 may be used to dynamically compute an optimal trigger altitude thereby increasing fidelity in height determination above target destination 140 and providing an advantage over prior dead set timers and barometers which cannot dynamically respond to a predetermined release altitude.

A landing state 250 is detected by the payload vehicle state detection system 352 of the payload vehicle 120 to detect a landing of the payload vehicle 120 and a location of the payload vehicle 120 whether at or near the target destination 140. When the landing state 250 is detected, the payload vehicle 120 may be trigged by the payload vehicle flight controller 350 to arrive at an "at-rest" state such that any payload vehicle descent arrest device 122A may be detached from the payload vehicle 120 and/or any servo-controllers associated with the payload vehicle descent arrest device 122A may be deactivated and/or put in a stowed configuration. Landing state 250 information may be communicated via a satellite or terrestrial cell communication network 340 from the payload vehicle 120 via payload vehicle Radio Frequency transceiver communication link 372B to the aircraft 110 and/or via target destination RF transceiver communication link 394B to the target destination 140.

The landing state 250 may be defined where the payload vehicle flightpath 124 of the payload vehicle 120 has terminated at or near the target destination 140. The payload vehicle sensor suite 354 detects this the landing state 250 and may send a deactivation trigger signal to depower of servomotors of the payload vehicle descent arrest system 122 to increase safety in handling the payload vehicle 120 by a recipient, or release a payload vehicle descent arrest device 122A, for example, parachute, to prevent the payload vehicle 120 from dragging across the target destination 140 when prevailing winds at the target destination 140 and across the target destination surface 150 are strong.

The aerial delivery system 300 may use each determined change in state to signal useful information to an internal log or be communicated via wireless communication to the aircraft 110 and/or a target destination 140 proximate or remote from the target destination 140. For instance, the system may notify the exact landing location of the payload vehicle 120 to the aircraft 110 or to ground personnel or may notify the same that unexpected winds at a particular altitude will anticipate a new target destination dissimilar from the original target destination 140.

Figure 3:
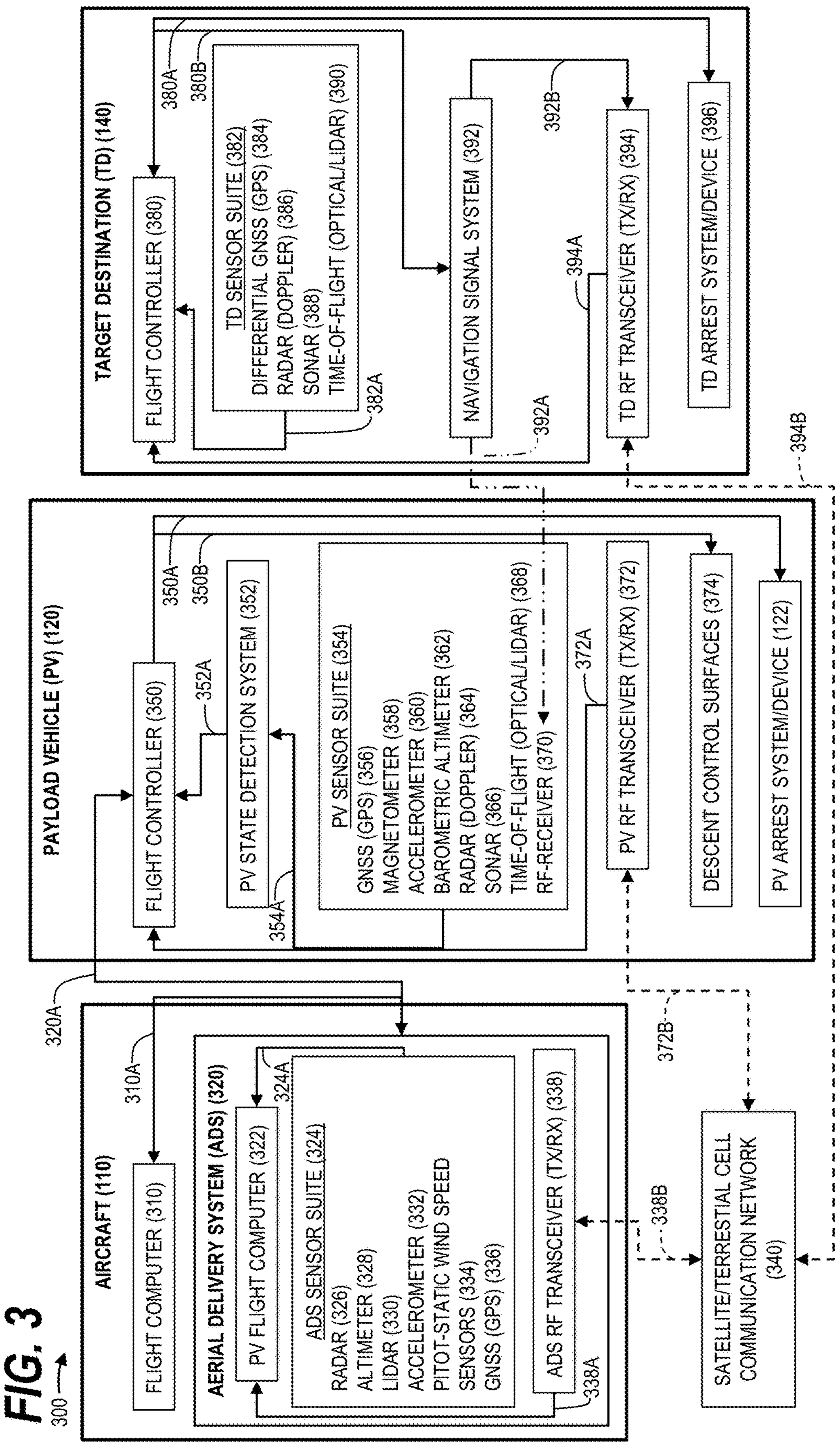
FIG. 3 illustrates a schematic system diagram of a distance sensed aerial payload vehicle descent arrest system including an airborne aerial delivery system, a payload vehicle and a target destination each configured to assist an arrest system or device to be triggered based on a sensed distance of the payload vehicle relative to the target destination.

FIG. 3 illustrates a schematic system diagram of an aerial delivery system 300, similar to the schematic system diagram 100 of FIG. 1, wherein a payload vehicle 120 delivered from an aircraft 110 toward a target destination 140 from a payload vehicle deployment point 114 along a payload vehicle flightpath 124 is configured to have a payload vehicle descent arrest system 122 or a target destination descent arrest system 396 assist in decelerating the payload vehicle 120 immediately before landing at the target destination.

The target destination descent arrest system 396 may include a net, webbing or harness suspending above the target destination surface 150 configured to catch the aerial payload vehicle 120 immediately above the target destination surface 150.

A plurality of airborne sensors in the ADS sensor suite 324 may be placed in the aircraft 110 that may be transmitted to the payload vehicle 120 prior to or during the descent of the payload vehicle 120 to the target destination 140. This is achieved by one or a plurality of sensors including, but not limited to, radar altimeter, LiDAR altimeter, multiple-axis accelerometers, pitot-static wind speed sensors, GNSS, or similar. This accommodates for aircraft-based sensors that are too large or expensive to be placed on individual payload vehicles to still communicate with the payload vehicle.

An aircraft 110 may include an aircraft flight computer 310 in communication with an ADS 320 that includes a payload vehicle flight computer 322 in communication with an ADS sensor suite 324 and an ADS Radio Frequency transceiver 338. The aircraft flight computer 310 may include all standard aircraft flight control input and controls for controlling and providing information to operation of the aircraft 110. As shown in FIG. 3, the aircraft flight computer 310 communicates control and navigation signals via an aircraft flight computer interface 310A to the aerial delivery system 320. The aerial delivery system 320 includes an ADS control interface 320A configured to coordinate sensor data, release timing, and communication with the payload vehicle.

The payload vehicle flight computer 322 of the ADS 320 may be in two-way communication with the aircraft flight computer 310 and the payload vehicle flight controller 350 of the payload vehicle 120 while the payload vehicle 120 is retained within the aircraft 110. A two-way communication between the payload vehicle 120 and the ADS 320 may be a hard-wired or tethered communication link or may be a wireless communication protocol. With this functionality, the ADS 320 may provide programming and flight control information to the payload vehicle flight controller 350 of the payload vehicle 120 before it is deployed from the aircraft 110. Furthermore, the ADS 320 may provide flight control and guidance information to the aircraft flight computer 310 of the aircraft 110 to enable the aircraft 110 to fly along a predetermined or dynamically changing aircraft flightpath 112 up to the payload vehicle deployment point 114 for more precise control of the payload vehicle 120 arriving at the target destination 140.

The payload vehicle flight computer 322 of the ADS 320 may also receive sensor output information from an ADS sensor suite 324 that may include an ADS radar 326, an ADS barometric altimeter 328, an ADS LiDAR 330, an ADS multiple-axis accelerometer 332, an ADS pitot-static wind speed sensor 334 and an ADS Global Navigation Satellite System sensor 336 (GNSS).

The ADS radar 326 may provide Radio Frequency based distance information of the aircraft 110 to the target destination 140 to the payload vehicle flight computer 322 of the ADS 320.

The ADS barometric altimeter 328 may provide barometric pressure information of the aircraft 110 in flight to the payload vehicle flight computer 322 of the ADS 320 to infer a relative altitude of the aircraft 110 above sea level.

The ADS LiDAR 330 may provide laser or image sensor-based distance information of the aircraft 110 to the target destination 140 to the payload vehicle flight computer 322 of the ADS 320.

The ADS multiple-axis accelerometer 332 may provide change in velocity measurement information of the aircraft 110 to the payload vehicle flight computer 322 of the ADS 320.

The ADS pitot-static wind speed sensor 334 may provide relative airspeed information of the aircraft 110 to the payload vehicle flight computer 322 of the ADS 320.

The ADS Global Navigation Satellite System sensor 336 may provide Global Positions Sensor (GPS)-based position information of the aircraft 110 to the payload vehicle flight computer 322 of the ADS 320.

An ADS Radio Frequency transceiver 338 may also be provided in the ADS 320, and/or may in the alternative be provided in the schematic system diagram 100 and in communication with the payload vehicle flight computer 322 of the ADS 320. The ADS radio frequency transceiver 338 includes an ADS RF transceiver output interface 338A for transmitting descent-related data and control signals to at least one of the payload vehicles and the target destination. The ADS Radio Frequency transceiver 338 is in two-way communication via a wireless ADS RF transceiver communication link 338B to a satellite or terrestrial cell communication network 340 that may also be in communication with the payload vehicle 120 via payload vehicle Radio Frequency transceiver communication link 372B and the target destination 140 via target destination RF transceiver communication link 394B as discussed below.

The payload vehicle 120 may include a payload vehicle flight controller 350 in communication with a payload vehicle descent arrest system 122 via payload vehicle flight controller descent arrest system trigger signal link 350A, and in communication with a payload vehicle descent control surface 374 via a payload vehicle flight controller descent control surface control signal link 350B.

The flight control system consists of multiple sensors that are capable of generating a flight "state prediction," or location of the payload in three-dimensional space. This is achieved by a plurality of sensors including, but not limited to, GNSS (Global Navigation Satellite Systems), magnetometry, multiple-axis accelerometers, barometric altimeters, cameras/optical flow sensors, LiDAR (Light Detection and Ranging), Time-of-Flight, Radar, and Sodar (Sonic or Sound Detection and Ranging). These sensors may be fused to a state prediction algorithm that principally detects errors in individual sensors and uses various mathematical approaches to blend the sensor data in calculation of a higher fidelity and reliable altitude measurement. Of specific note is the use of "relative" sensors, (e.g., cameras/optical sensors, LiDAR, Radar and Sonar), that actively detect in real time the presence of the ground plane or objects below. This is noted in distinction of "absolute" sensors, (e.g., GNSS or GPS sensors, magnetometers, and barometric altimeters), that calculate a position relative to the globe and thus require an accurate database and calibration of current height above ground.

The payload vehicle flight controller 350 may also be in communication with a payload vehicle state detection system 352 that receives sensor information from a plurality of sensors disposed on or in the payload vehicle 120 comprising a payload vehicle sensor suite 354 including a payload vehicle Global Navigation Satellite System sensor 356, (GNSS), a payload vehicle magnetometer 358, a payload vehicle multiple-axis accelerometer 360, a payload vehicle barometric altimeter 362, a payload vehicle radar 364, a payload vehicle sonar sensor 366, a payload vehicle time-of-flight sensor 368 and a payload vehicle Radio Frequency receiver 370. The payload vehicle state detection system outputs a fused state signal 352A representing a combined estimate of altitude, pose, and descent state derived from multiple sensor inputs.

The payload vehicle sensor suite 354 outputs a payload vehicle sensor suite fused output signal 354A to the payload vehicle state detection system 352 so the payload vehicle state detection system 352 can calculate in real-time the payload vehicle distance 130 to the target destination 140. One or multiple combinations of the sensor output from the payload vehicle sensor suite 354 via payload vehicle sensor suite fused output signal 354A above may be used to create a high-fidelity payload vehicle 120 altitude, pose, and/or atmospheric measurements of the descending payload vehicle 120 along the payload vehicle flightpath 124 in real-time. The payload vehicle flight controller 350 uses this payload vehicle sensor suite fused output signal 354A data to determine a location in real time and then calculate and issue a static flare altitude trigger to the payload vehicle descent arrest system 122 or the target destination descent arrest system 396. Alternatively, the payload vehicle flight controller 350 may use the payload vehicle sensor suite fused output signal 354A to in real-time dynamically compute an optimal flare trigger signal to send to the payload vehicle descent arrest system 122.

The payload vehicle Global Navigation Satellite System sensor 356, may provide Global Positions Sensor (GPS)-based position information of the payload vehicle 120 while on the payload vehicle flightpath 124 to the payload vehicle state detection system 352 in the payload vehicle 120.

The payload vehicle magnetometer 358 may provide bearing information of the payload vehicle 120 while on the payload vehicle flightpath 124 to the payload vehicle state detection system 352 in the payload vehicle 120.

The payload vehicle multiple-axis accelerometer 360 may provide change in velocity measurements of the payload vehicle 120 while on the payload vehicle flightpath 124 to the payload vehicle state detection system 352 in the payload vehicle 120.

The payload vehicle barometric altimeter 362 may provide barometric pressure information of the payload vehicle 120 while on the payload vehicle flightpath 124 to the payload vehicle state detection system 352 in the payload vehicle 120.

The payload vehicle radar 364 may provide Radio Frequency based distance information of the payload vehicle 120 while on the payload vehicle flightpath 124 to the payload vehicle state detection system 352 in the payload vehicle 120.

The payload vehicle sonar sensor 366 may provide ultrasonic or sonic, (i.e., audio), based distance information of the payload vehicle 120 while on the payload vehicle flightpath 124 to the payload vehicle state detection system 352 in the payload vehicle 120.

The payload vehicle time-of-flight sensor 368 may provide light, laser or image sensor-based distance information of the payload vehicle 120 while on the payload vehicle flightpath 124 to the payload vehicle state detection system 352 in the payload vehicle 120.

The payload vehicle Radio Frequency receiver 370 may receive RF-based navigation control signals and/or descent arrest system trigger control signals broadcast from a target destination navigation signal system 392 on the target destination 140.

The payload vehicle flight controller 350 may also be in communication with a payload vehicle Radio Frequency transceiver 372 in two-way communication with the satellite or terrestrial cell communication network 340 via the payload vehicle Radio Frequency transceiver communication link 372B. The payload vehicle Radio Frequency transceiver communication link 372B allows the payload vehicle 120 to both receive and transmit status information and control signals to the aircraft 110 and the target destination 140 via the satellite or terrestrial cell communication network 340.

The target destination 140 may include a target destination flight controller 380 responsible for communicating flight control and target destination flight controller descent arrest system trigger signal link 380A to the payload vehicle 120. For example, the target destination flight controller 380 may communicate via target destination navigation signal link 392A via target destination navigation signal system 392 to the payload vehicle Radio Frequency receiver 370 of the payload vehicle 120 to employ the payload vehicle flight controller 350 to control the payload vehicle descent control surfaces 374 such that the payload vehicle 120 navigates to the target destination 140.

During the payload vehicle 120 descending along the payload vehicle flightpath 124, aerodynamic shapes or payload vehicle descent control surface 374 may also be used to increase reliability and predictability of the descent payload vehicle flightpath 124 or modify the payload vehicle flightpath 124 to provide lateral or rotational translation during descent along the payload vehicle flightpath 124. In such systems, the objectives of arrest descent may be detrimental or conflicting with the objectives of controlled or predictable descent. Thus, the arrest descent system may preferably be triggered during a "flare" stage of flight. Furthermore, it may be desirable to precisely trigger a flare either to remain in a preferable aerodynamic configuration for a desired portion of the descent along the payload vehicle flightpath 124, or to initiate a descent arrest at a specific height of the payload vehicle 120 above the ground.

Controlling the payload vehicle descent control surface 374 may occur when the target destination flight controller 380 of the target destination 140 determines that the payload vehicle flightpath 124 needs to be dynamically modified while the payload vehicle 120 is descending along the payload vehicle flightpath 124. For example, this scenario may allow for a moving target destination 140 to redirect the payload vehicle 120 if the target destination 140 is disposed on a water-borne vehicle or a moving land-based vehicle.

Additionally, the target destination flight controller 380 may be responsible for communicating target destination flight controller descent arrest system trigger signal link 380A to the payload vehicle 120 to cause the payload vehicle descent arrest system 122 to deploy upon a command of a trigger signal sent by the target destination 140 via the target destination navigation signal system 392 and the target destination navigation signal link 392A.

The target destination flight controller 380 may be in two-way communication via target destination flight controller descent arrest system trigger signal link 380A to a target destination descent arrest system 396, and via target destination flight controller navigation system control signal link 380B to the target destination navigation signal system 392 as discussed above. The target destination descent arrest system 396 may be represented by target destination descent arrest system 144 of FIG. 1, or any descent arrest system or device configured to decelerate the payload vehicle 120 immediately before arriving at the target destination 140.

The target destination flight controller 380 may also be in communication with a plurality of sensor information from a target destination sensor suite 382 that may include a target destination differential Global Navigation Satellite System sensor 384, a target destination RF radar 386, a target destination sonar sensor 388 and a time-of-flight sensor 390. The target destination sensor suite 382 provides a sensor fusion output 382A representative of a combined ground-based estimate of payload vehicle distance and altitude above the target destination.

The target destination sensor suite 382 at or near the target destination 140 may also be used to determine altitude of the descending payload vehicle 120 above target destination 140.

The target destination differential Global Navigation Satellite System sensor 384 may provide differential GNSS/GPS position information between the payload vehicle 120 and the physical target destination coordinates 142 of the target destination 140 and either relay that differential GNSS/GPS position information directly to the payload vehicle 120 via target destination navigation signal system 392, or may exercise control over the payload vehicle 120 by transmitting navigation control signals via target destination navigation signal link 392A of the target destination navigation signal system 392 to the payload vehicle Radio Frequency receiver 370 of the payload vehicle 120.

The target destination RF radar 386 may provide RF-based distance information between the descending payload vehicle 120 and the target destination 140.

The target destination sonar sensor 388 may provide ultra-sonic or sonic-based, (i.e., audio), distance information between the descending payload vehicle 120 and the target destination 140.

The time-of-flight sensor 390 may provide light, laser and/or optical sensor-based distance information between the descending payload vehicle 120 and the target destination 140.

The target destination sensor suite 382 may be used to create a navigation signal that may be detected by and or transmitted to the descending payload vehicle 120. This is achieved by one or a plurality of sensors such as a directional radio signal, other forms of radio navigation, a laser beam or optical pattern, sonar, or radar. This ground-based navigation signal via target destination navigation signal link 392A or target destination navigation signal system output signal 392B via the target destination Radio Frequency transceiver 394 is received by the descending payload vehicle 120, and based upon inclination from the horizon and horizontal distance from the landing zone, the signal may be further used to send a "trip wire" or descent arrest system deployment signal at a predetermined height above the ground level or the target destination.

The target destination 140 may also include target destination Radio Frequency transceiver 394 configured to communication via target destination RF transceiver output signal link 394A to the target destination flight controller 380 for communication received via target destination RF transceiver communication link 394B from the satellite or terrestrial cell communication network 340, and receive navigation control information from the target destination navigation signal system 392 via target destination navigation signal system output signal 392B for transmission to either the aircraft 110 or payload vehicle 120 via target destination RF transceiver communication link 394B by the satellite or terrestrial cell communication network 340. The target destination Radio Frequency transceiver 394 additionally provide an alternative communication path to the payload vehicle 120 when the target destination navigation signal link 392A from the target destination navigation signal system 392 directly to the payload vehicle Radio Frequency receiver 370 of the payload vehicle 120 is not functional or out of range.

Figure 4:
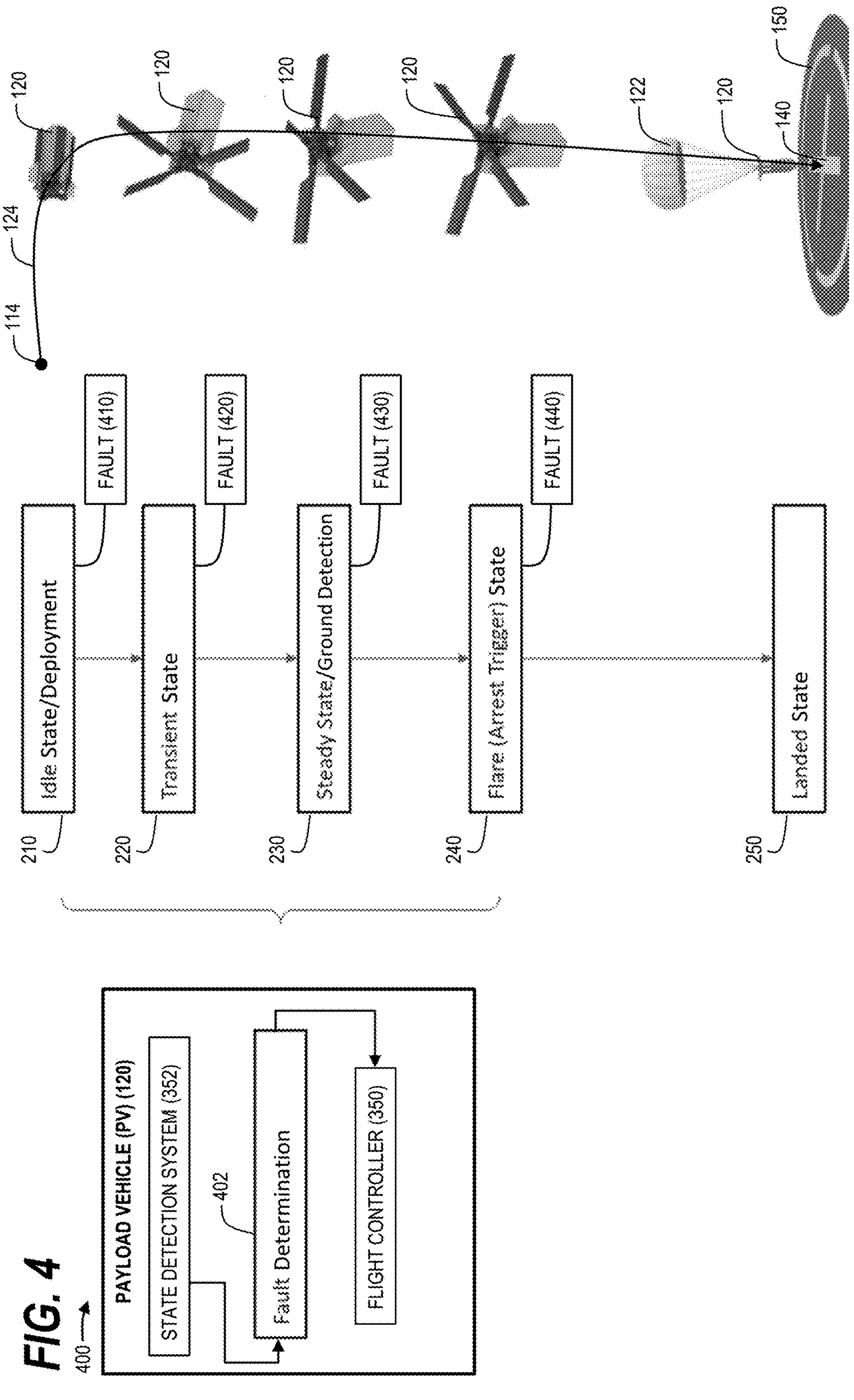
FIG. 4 illustrates a schematic fault state diagram of fault determination in any of the flight states of the aerial payload vehicle of FIG. 2 as it descends toward the target destination.

FIG. 4 illustrates a schematic fault state diagram 400 of fault determination 402 made by the payload vehicle state detection system 352, as shown in FIG. 3, based on the received payload vehicle sensor suite fused output signal 354A of any flight state of the aerial payload vehicle 120 as it descends along the payload vehicle flightpath 124 toward the target destination.

During any portion of the payload vehicle flightpath 124 of the payload vehicle 120 to the target destination 140, based upon sensed real-time conditions by the payload vehicle sensor suite 354, a fault state may be detected and trigger a fault state. Optionally, a fault state may trigger activation of the payload vehicle descent arrest system 122 and/or the target destination descent arrest system 396 to provide a recalculated soft touch down, change the flare height or change the original target destination 140 to a new target destination. Fault states may also be communicated wirelessly to the aircraft 110, and/or a ground-based monitor proximate and/or remote from the target destination 140.

The payload vehicle state detection system 352 of the payload vehicle 120 may detect a deployment state fault 410 in the deployment state 210 and communication the deployment state fault 410 to the payload vehicle flight controller 350 for any payload vehicle flightpath 124 correction or any recalculated descent arrest trigger signals that need to be sent to the payload vehicle flight controller descent arrest system trigger signal link 350A at a different time that previously calculated.

The payload vehicle state detection system 352 of the payload vehicle 120 may detect a transient state fault 420 in the transient state 220 of the payload vehicle flightpath 124 and communicate the transient state fault 420 to the payload vehicle flight controller 350 for any payload vehicle flightpath 124 correction or any recalculated descent arrest trigger signals that need to be sent to the payload vehicle flight controller descent arrest system trigger signal link 350A at a different time that previously calculated.

The payload vehicle state detection system 352 of the payload vehicle 120 may detect a steady state or ground detection state fault 430 in the steady state or ground detection state 230 of the payload vehicle flightpath 124 and communicate the steady state or ground detection state fault 430 to the payload vehicle flight controller 350 for any payload vehicle flightpath 124 correction or any recalculated descent arrest trigger signals that need to be sent to the payload vehicle flight controller descent arrest system trigger signal link 350A at a different time that previously calculated.

The payload vehicle state detection system 352 of the payload vehicle 120 may detect a descent arrest deployment trigger state fault 440 in the descent arrest deployment trigger state 240 of the payload vehicle flightpath 124 and communicate the descent arrest deployment trigger state fault 440 to the payload vehicle flight controller 350 for any payload vehicle flightpath 124 correction or any recalculated descent arrest trigger signals that need to be sent to the payload vehicle flight controller descent arrest system trigger signal link 350A at a different time that previously calculated, or may communicate the descent arrest deployment trigger state fault 440 to the target destination 140 for triggering the target destination descent arrest system 396 of the target destination 140.

In summary, the aerial delivery system disclosed herein is provided to deliver cargo from an air launch location to a target ground location. A system for detecting the height above ground level (AGL) during airdrop operations provides a higher degree of fidelity in AGL measurement by using a fusion of multiple sensor inputs to feed a state prediction algorithm. The state prediction algorithm may provide a descent arrest trigger signal to a descent arrest system on the payload vehicle to actuate the descent arrest system.

The system further includes the ability to determine and calibrate sensor biases prior to payload descent launch or in real-time payload descent on-the-fly sensor calibration.

The system further includes the ability to offset a descent arrest trigger release in altitude, height AGL, time or barometric pressure to compensate for a descent arrest opening time of an arrest deployment feature.

The system further includes a state prediction algorithm that in real-time dynamically computes an optimal descent arrest "flare" trigger signal based upon current sensor data, thereby increasing accuracy of the payload vehicle reaching the target destination. These dynamic conditions may include payload mass, wind field vector, center of gravity, payload vehicle velocity, air density, temperature, heading, pose, angle of attack, altitude and parachute dynamics.

The system further includes a flight controller that may transit through multiple controlled states based upon a calculated estimation of altitude, pose and velocity.

The system further includes where ground sensors proximate the target destination may measure, confirm and/or alert the payload vehicle state and altitude above the target destination and wirelessly communicate the same to the payload and/or the parent aerial vehicle in real time.

The system further includes a ground sensor proximate to the target destination may transmit a signal aimed at an inclination to determine the payload vehicle altitude.

The system further includes detecting the payload vehicle landing on the ground and thereby providing a landing state trigger that may be wirelessly communicated to indicate a landing location, a payload vehicle pose, and/or a payload shock force. The landing state trigger may also be used to communicate an alarm, an audible or visual alert to indicate a payload state on the ground.

The system further includes the landing state trigger may also actuate a servomotor or motor actuator to reconfigure a descent arrest device, i.e., moving toggles on a parachute or changing a flap angle on aerodynamic control surfaces.

The system further includes a flight computer on the parent aircraft that may update, calibrate, or initialize the aerial delivery system prior to launch with a new altitude or flight descent data about the intended flight path to the target destination.

The system further includes a flight computer that may transmit data to the aerial delivery system in flight to update altitude, weather or other data that may impact the descent arrest system trigger release criteria.

Figure 5:
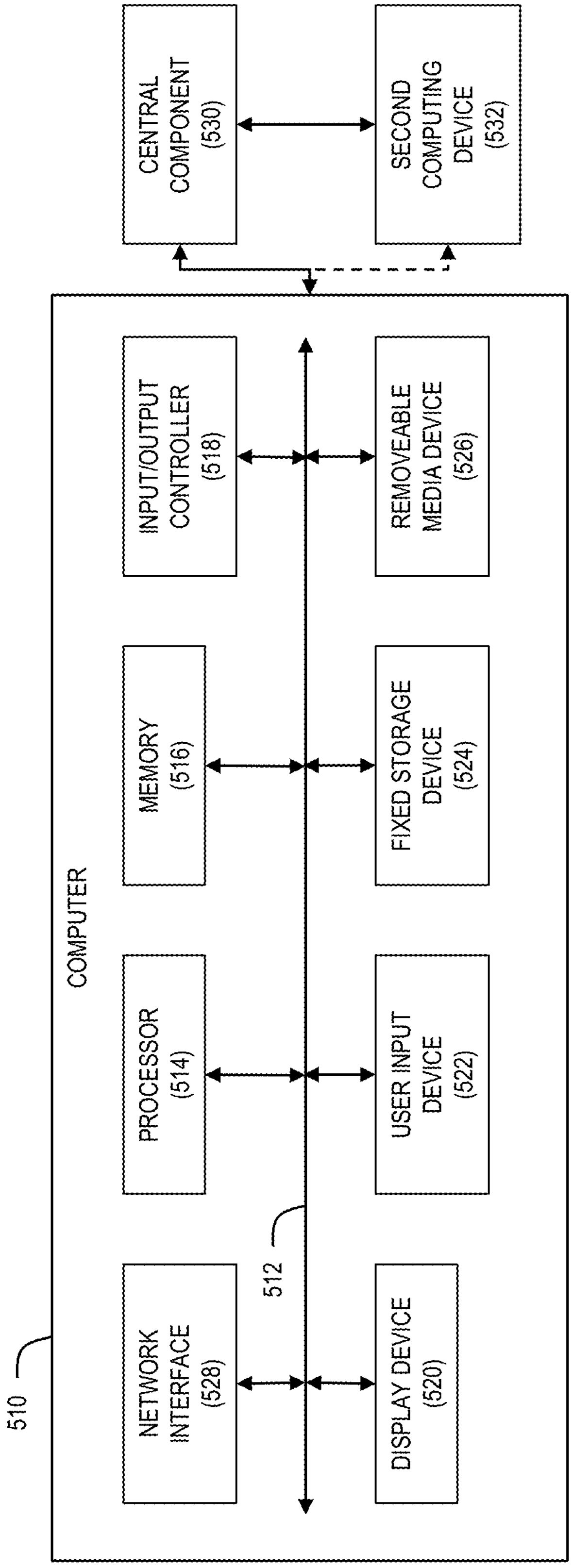
FIG. 5 a schematic diagram of an exemplary hardware environment that can be used to implement the aspects of the aerial payload vehicle descent arrest system in the aspects described in FIGS. 1-4.

FIG. 5 a schematic diagram of an exemplary computer hardware environment 500 that can be used to implement the aspects described in FIGS. 1-4.

Implementations of the presently disclosed subject matter may be implemented in and used with a variety of component and network architectures. FIG. 5 is an exemplary computer hardware environment 500 and an example computer 510 suitable for implementing implementations of the presently disclosed subject matter, and particularly the aircraft flight computer 310, the payload vehicle flight computer 322 of the ADS 320, the payload vehicle flight controller 350, the payload vehicle state detection system 352, the target destination flight controller 380, and the target destination navigation signal system 392, and any of the above disclosed elements in the aircraft 110, the payload vehicle 120 and the target destination 140, of FIGS. 1-4.

As discussed in further detail herein, the computer 510 may be a single computer in a network of multiple computers. As shown in FIG. 5, computer 510 may communicate with a central component 530, (e.g., server, cloud server, database, etc.). The central component 530 may communicate with one or more other computers such as the second computer 532. According to this implementation, the information obtained to and/or from a central component 530 may be isolated for each computer such that the computer 510 may not share information with second computer 532. Alternatively, or in addition, the computer 510 may communicate directly with the second computer 532.

The computer 510, (e.g., user computer, enterprise computer, etc.), includes a bus 512 which interconnects major components of the computer 510, such as a central processor 514, a memory 516, (typically RAM, but which may also include ROM, flash RAM, or the like), an input/output controller 518, a user display 520, such as a display or touch screen via a display adapter, a user input interface 522, which may include one or more controllers and associated user input or devices such as a keyboard, mouse, WIFI/cellular radios, touchscreen, microphone/speakers and the like, and may be closely coupled to the input/output controller 518, fixed storage 524, such as a hard drive, flash storage, Fiber Channel network, SAN device, SCSI device, and the like, and a removable media storage device 526 operative to control and receive an optical disk, flash drive, and the like.

The bus 512 enable data communication between the central processor 24 and memory 516, which may include read-only memory (ROM) or flash memory (neither shown), and random-access memory (RAM), (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 510 can be stored on and accessed via a computer readable medium, such as a hard disk drive, (e.g., fixed storage 524), an optical drive, floppy disk, or another removable media storage device 526.

The fixed storage 524 may be integrated with the computer 510 or may be separate and accessed through other interfaces. A network interface 528 may provide a direct connection to a remote server via a telephone link, to the Internet via an internet service provider (ISP), or a direct connection to a remote server via a direct network link to the Internet via a POP (point of presence) or other technique. The network interface 528 may provide such connection using wireless techniques, including digital cellular telephone connection, Cellular Digital Packet Data (CDPD) connection, digital satellite data connection or the like. For example, network interface 528 may enable the computer to communicate with other computers via one or more local, wide-area, or other networks.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 516, fixed storage 524, removable media storage device 526, or on a remote storage location.

Figure 6:
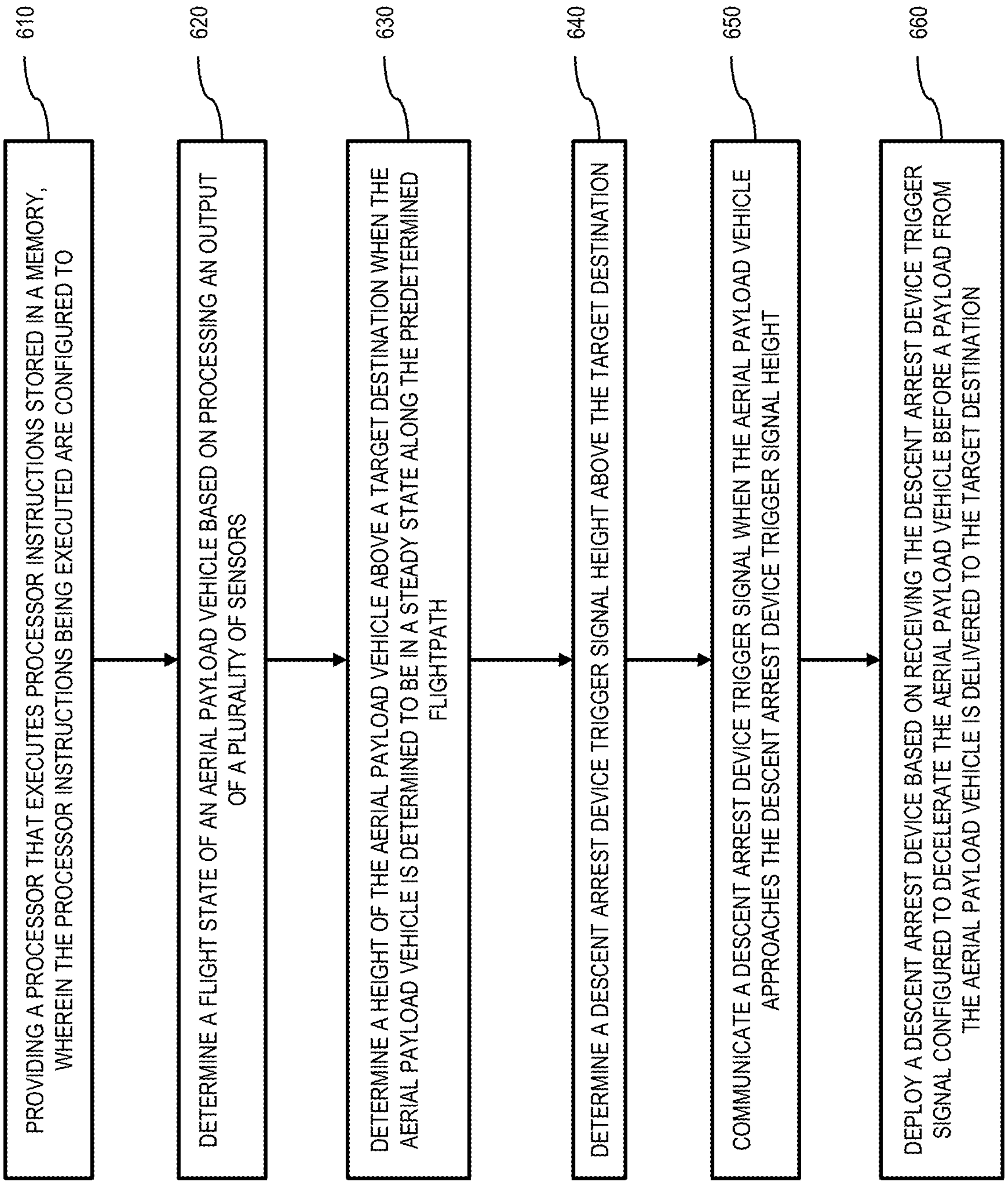
FIG. 6 is a logic diagram of a method of activating a descent arrest device associated with an aerial payload vehicle which is configured to descend along a predetermined flightpath toward a target destination.

FIG. 6 is a logic diagram 600 of a method of activating a descent arrest device associated with an aerial payload vehicle which is configured to descend along a predetermined flightpath toward a target destination, the method including providing 610 a processor that executes processor instructions stored in a memory, wherein the processor instructions being executed are configured to determine 620 a flight state of an aerial payload vehicle based on processing an output of a plurality of sensors, determine 630 a height of the aerial payload vehicle above a target destination when the aerial payload vehicle is determined to be in a steady state along the predetermined flightpath, determine 640 a descent arrest device trigger signal height above the target destination, and communicate 650 a descent arrest device trigger signal when the aerial payload vehicle approaches the descent arrest device trigger signal height, and furthermore, deploy 660 a descent arrest device based on receiving the descent arrest device trigger signal configured to decelerate the aerial payload vehicle before a payload from the aerial payload vehicle is delivered to the target destination.

The method of activating the descent arrest device further includes where the flight state is determined to be one from a group of an idle state, a transient state, a steady state configured to determine a height of the aerial payload vehicle above a target destination, a descent arrest activation state, and a landing state.

The method of activating the descent arrest device further includes where determining the height of the aerial payload vehicle above a target destination is based on receiving a plurality of signals from at least a Global Navigation Satellite System receiver, a differential Global Navigation Satellite System device, a magnetometer, a multiple-axis accelerometer, a barometric altimeter, a radio frequency distance sensing radar, a time-of-flight distance sensing sensor, and an audio frequency distance sensing sensor.

The method of activating descent arrest device further includes where determining a descent arrest device trigger signal height above the target destination further includes determining one of a fault or a change in characteristics of the aerial payload vehicle, determining an alternative descent arrest device trigger signal height based on one of the fault or the change in characteristics of the aerial payload vehicle, and communicate an alternative descent arrest device trigger signal when the aerial payload vehicle approaches the alternative descent arrest device trigger signal height.

The method of activating descent arrest device further includes where the processor instructions are further configured to determine a fault in at least one flight state from a group of the idle state, the transient state, the steady state, the descent arrest activation state, and the landing state.

The method of activating descent arrest device further includes where the processor instructions are further configured to determine a second height of the aerial payload vehicle above the target destination, determine a second descent arrest device trigger signal height above the target destination, communicate a second descent arrest device trigger signal when the aerial payload vehicle approaches the second descent arrest device trigger signal height, and deploy the descent arrest device based on receiving the second descent arrest device trigger signal configured to decelerate the aerial payload vehicle before a payload from the aerial payload vehicle is delivered to the target destination.

In summary, some aspects, the techniques described herein relate to an aerial payload vehicle descent arrest system including: an aerial payload vehicle configured to descend along a predetermined flightpath toward a target destination; a descent state detection system configured to receive sensor output information from a plurality of sensors, to compute a sensed distance to the target destination based on sensor output information from at least two sensors of the plurality of sensors, and to generate a descent arrest device trigger signal based on a sensed altitude; and a descent arrest device configured to receive the descent arrest device trigger signal from the descent state detection system and to decelerate the aerial payload vehicle before a payload from the aerial payload vehicle is delivered to the target destination.

In some aspects, the techniques described herein relate to an aerial payload vehicle descent arrest system, wherein the descent state detection system is configured on the aerial payload vehicle.

In some aspects, the techniques described herein relate to an aerial payload vehicle descent arrest system, wherein the descent state detection system is configured proximate the target destination.

In some aspects, the techniques described herein relate to an aerial payload vehicle descent arrest system, wherein the descent arrest device is configured on the aerial payload vehicle.

In some aspects, the techniques described herein relate to an aerial payload vehicle descent arrest system, wherein the descent arrest device includes at least one of: a parachute; an autorotating blade assembly; and one of an inflatable or frangible impact absorption device.

In some aspects, the techniques described herein relate to an aerial payload vehicle descent arrest system, wherein the descent arrest device is configured proximate the target destination.

In some aspects, the techniques described herein relate to an aerial payload vehicle descent arrest system, wherein the descent arrest device includes at least one of a net, webbing or harness configured to catch the aerial payload vehicle proximate the target destination.

In some aspects, the techniques described herein relate to an aerial payload vehicle descent arrest system, wherein the descent arrest device trigger signal is generated from the descent state detection system disposed on the aerial payload vehicle configured to activate the descent arrest device on the aerial payload vehicle.

In some aspects, the techniques described herein relate to an aerial payload vehicle descent arrest system, wherein the descent arrest device trigger signal is generated from the descent state detection system disposed proximate the target destination and transmitted to the aerial payload vehicle configured to activate the descent arrest device on the aerial payload vehicle.

In some aspects, the techniques described herein relate to an aerial payload vehicle descent arrest system, wherein the plurality of sensors are disposed in the aerial payload vehicle and include at least: a Global Navigation Satellite System receiver; a magnetometer; a multiple-axis accelerometer; a barometric altimeter; a radio frequency distance sensing radar; a time-of-flight distance sensing sensor; and an audio frequency distance sensing sensor.

In some aspects, the techniques described herein relate to an aerial payload vehicle descent arrest system, wherein the plurality of sensors are disposed proximate the target destination and include at least: a differential Global Navigation Satellite System device; a radio frequency distance sensing radar; a time-of-flight distance sensing sensor; and an audio frequency distance sensing sensor.

In some aspects, the techniques described herein relate to an aerial payload vehicle including: a compartment for a payload configured to descend along a predetermined flightpath toward a target destination for attempting delivery of the payload to the target destination; a descent state detection system configured: to receive sensor output information from a plurality of sensors disposed on the aerial payload vehicle; to compute a sensed distance to the target destination based on sensor output information from at least two sensors of the plurality of sensors; and to generate a descent arrest device trigger signal based on a sensed altitude; and a descent arrest device disposed on the aerial payload vehicle and configured: to receive the descent arrest device trigger signal from the descent state detection system; and to decelerate the aerial payload vehicle before the payload is delivered to the target destination.

In some aspects, the techniques described herein relate to an aerial payload vehicle, wherein the aerial payload vehicle further includes a descent arrest device on the aerial payload vehicle including at least one of: a parachute; an autorotating blade assembly; and one of an inflatable or frangible impact absorption device.

In some aspects, the techniques described herein relate to an aerial payload vehicle, wherein the aerial payload vehicle further includes a descent arrest device proximate the target destination including at least one of: a net; a webbing; and a harness, wherein the descent arrest device is suspended above a target destination surface and configured to one of catch or decelerate the aerial payload vehicle before contacting the target destination surface.

The foregoing description, for the purpose of explanation, has been described with reference to specific arrangements and configurations. However, the illustrative examples provided herein are not intended to be exhaustive or to limit embodiments of the disclosed subject matter to the precise forms disclosed. Many modifications and variations are possible in view of the disclosure provided herein. The embodiments and arrangements were chosen and described in order to explain the principles of embodiments of the disclosed subject matter and their practical applications. Various modifications may be used without departing from the scope or content of the disclosure and claims presented herein.

What is claimed is:

1. An aerial payload vehicle descent arrest system comprising:

an aerial payload vehicle configured to descend along a predetermined flightpath toward a target destination;

a flight controller comprising a processor and a memory storing instructions configured to; receive sensor output information from a plurality of sensors disposed on the aerial payload vehicle, the plurality of sensors including: a Global Navigation Satellite System (GNSS) receiver, and at least two relative range sensors comprising: a radio frequency distance sensing radar, a time-of-flight distance sensing sensor, and an ultrasonic distance sensing sensor, wherein each of the at least two relative range sensors is configured to actively detect a ground plane or objects below the aerial payload vehicle; compute an above-ground-level (AGL) height of the aerial payload vehicle above the target destination by combining outputs from at least the GNSS receiver and the at least two relative range sensors using a state prediction algorithm that detects errors in individual sensors and blends sensor data; and generate a descent arrest device trigger signal based on the AGL height and a terminal velocity of the aerial payload vehicle; and a descent arrest device configured to receive the descent arrest device trigger signal from the flight controller and to decelerate the aerial payload vehicle before a payload from the aerial payload vehicle is delivered to the target destination.

2. The aerial payload vehicle descent arrest system of claim 1, wherein the descent state detection system is configured on the aerial payload vehicle.

3. The aerial payload vehicle descent arrest system of claim 1, wherein the descent state detection system is configured proximate the target destination.

4. The aerial payload vehicle descent arrest system of claim 1, wherein the descent arrest device is configured on the aerial payload vehicle.

5. The aerial payload vehicle descent arrest system of claim 4, wherein the descent arrest device includes at least one of:

a parachute;

an autorotating blade assembly; and one of an inflatable or frangible impact absorption device.

6. The aerial payload vehicle descent arrest system of claim 1, wherein the descent arrest device is configured proximate the target destination.

7. The aerial payload vehicle descent arrest system of claim 6, wherein the descent arrest device includes at least one of a net, webbing or harness configured to catch the aerial payload vehicle proximate the target destination.

8. The aerial payload vehicle descent arrest system of claim 1, wherein the descent arrest device trigger signal is generated from the descent state detection system disposed on the aerial payload vehicle configured to activate the descent arrest device on the aerial payload vehicle.

9. The aerial payload vehicle descent arrest system of claim 1, wherein the descent arrest device trigger signal is generated from the descent state detection system disposed proximate the target destination and transmitted to the aerial payload vehicle configured to activate the descent arrest device on the aerial payload vehicle.

10. The aerial payload vehicle descent arrest system of claim 1, wherein the plurality of sensors are disposed in the aerial payload vehicle and include at least:

a Global Navigation Satellite System receiver;

a magnetometer;

a multiple-axis accelerometer;

a barometric altimeter;

a radio frequency distance sensing radar;

a time-of-flight distance sensing sensor; and an audio frequency distance sensing sensor.

11. The aerial payload vehicle descent arrest system of claim 1, wherein the plurality of sensors are disposed proximate the target destination and include at least:

a differential Global Navigation Satellite System device;

a radio frequency distance sensing radar;

a time-of-flight distance sensing sensor; and an audio frequency distance sensing sensor.

12. A method of activating a descent arrest device associated with an aerial payload vehicle which is configured to descend along a predetermined flightpath toward a target destination, the method comprising:

providing a processor that executes processor instructions stored in a memory, wherein the processor instructions being executed are configured to:

determine a flight state of an aerial payload vehicle based on processing an output of a plurality of sensors;

determine an above-ground-level (AGL) height of the aerial payload vehicle above the target destination when the aerial payload vehicle is determined to be in a steady state along the predetermined flightpath, wherein determining the AGL height above the target destination comprises combining outputs from at least one Global Navigation Satellite System (GNSS) receiver and at least two relative range sensors comprising: a radio frequency distance sensing radar, a time-of-flight distance sensing sensor, and an ultrasonic distance sensing sensor using a state prediction algorithm that detects errors in individual sensors and blends sensor data;

determine a descent arrest device trigger signal height above the target destination based at least in part on the AGL height and a terminal velocity; and communicate a descent arrest device trigger signal when the aerial payload vehicle approaches the descent arrest device trigger signal height; and deploy the descent arrest device based on receiving the descent arrest device trigger signal.

13. The method of activating the descent arrest device of claim 12, wherein the flight state is determined to be one from a group of:

an idle state;

a transient state;

a steady state configured to determine the height of the aerial payload vehicle above the target destination;

a descent arrest activation state; and a landing state.

14. The method of activating descent arrest device of claim 13, wherein the processor instructions are further configured to determine a fault in at least one flight state from a group of:

the idle state;

the transient state;

the steady state;

the descent arrest activation state; and the landing state.

15. The method of activating descent arrest device of claim 14, wherein, in response to determining the fault in the at least one flight state, the processor instructions are further configured to:

determine a second height of the aerial payload vehicle above the target destination;

determine a second descent arrest device trigger signal height above the target destination;

communicate the second descent arrest device trigger signal when the aerial payload vehicle approaches the second descent arrest device trigger signal height; and deploy the descent arrest device based on receiving the second descent arrest device trigger signal.

16. The method of activating the descent arrest device of claim 12, wherein determining the height of the aerial payload vehicle above the target destination is based on receiving a plurality of signals from at least:

a Global Navigation Satellite System receiver;

a differential Global Navigation Satellite System device;

a magnetometer;

a multiple-axis accelerometer;

a barometric altimeter;

a radio frequency distance sensing radar;

a time-of-flight distance sensing sensor; and an audio frequency distance sensing sensor.

17. The method of activating descent arrest device of claim 12, wherein determining the descent arrest device trigger signal height above the target destination further comprises:

determining one of a fault or a change in characteristics of the aerial payload vehicle;

determining an alternative descent arrest device trigger signal height based on one of the fault or the change in characteristics of the aerial payload vehicle; and communicating an alternative descent arrest device trigger signal when the aerial payload vehicle approaches the alternative descent arrest device trigger signal height.

18. An aerial payload vehicle comprising:

a compartment for a payload configured to descend along a predetermined flightpath toward a target destination for attempting delivery of the payload to the target destination;

a descent state detection system comprising a flight controlling including a processor and memory configured to:

receive sensor output information from a plurality of sensors disposed on the aerial payload vehicle, the plurality of sensors including: a Global Navigation Satellite System (GNSS) receiver and at least two relative range sensors comprising: a radio frequency distance sensing radar, a time-of-flight distance sensing sensor, and an ultrasonic distance sensing sensor;

compute an above-ground-level (AGL) height above the target destination by combining outputs from at least the GNSS receiver and the at least two relative range sensors using a state prediction algorithm that detects errors in individual sensors and blends sensor data; and generate a descent arrest device trigger signal based on the AGL height; and a descent arrest device disposed on the aerial payload vehicle and configured to:

receive the descent arrest device trigger signal from the descent state detection system; and decelerate the aerial payload vehicle before the payload is delivered to the target destination.

19. The aerial payload vehicle of claim 18, wherein the aerial payload vehicle further comprises the descent arrest device on the aerial payload vehicle including at least one of:

a parachute;

an autorotating blade assembly; and one of an inflatable or frangible impact absorption device.

20. The aerial payload vehicle of claim 18, wherein the aerial payload vehicle further comprises the descent arrest device proximate the target destination including at least one of:

a net;

a webbing; and a harness, wherein the descent arrest device is suspended above a target destination surface and configured to one of catch or decelerate the aerial payload vehicle before contacting the target destination surface.

* * * * *